United States Patent [19]

Felbeck, Jr.

[11] 4,188,193
[45] Feb. 12, 1980

[54] PROCESS FOR PRODUCING HYDROCARBON GAS FROM ORGANIC PLANT MATERIAL

[75] Inventor: George T. Felbeck, Jr., Wakefield, R.I.

[73] Assignee: University of Rhode Island, Kingston, R.I.

[21] Appl. No.: 22,528

[22] Filed: Mar. 21, 1979

[51] Int. Cl.$^2$ ............................ C10J 3/00; C10B 2/04
[52] U.S. Cl. .................................. 48/197 R; 48/209; 423/237; 208/10
[58] Field of Search ............ 48/209, 197 R; 423/644, 423/648 R, 351, 237; 208/10

[56] References Cited

U.S. PATENT DOCUMENTS

| 3,733,255 | 5/1973 | Appell et al. | 48/209 |
| 3,989,480 | 11/1976 | Appell et al. | 48/209 |
| 4,081,510 | 3/1978 | Kato et al. | 423/351 |
| 4,113,446 | 8/1978 | Modell et al. | 48/209 |

*Primary Examiner*—S. Leon Bashore
*Assistant Examiner*—Michael Goldman
*Attorney, Agent, or Firm*—Thompson, Birch, Gauthier & Samuels

[57] ABSTRACT

Plant-derived organic material is converted to high BTU gas by heating the organic material with ammonia in the presence of a vanadium +3 or +4 catalyst and a hydrogenation catalyst in an atmosphere substantially free of oxygen.

7 Claims, 1 Drawing Figure

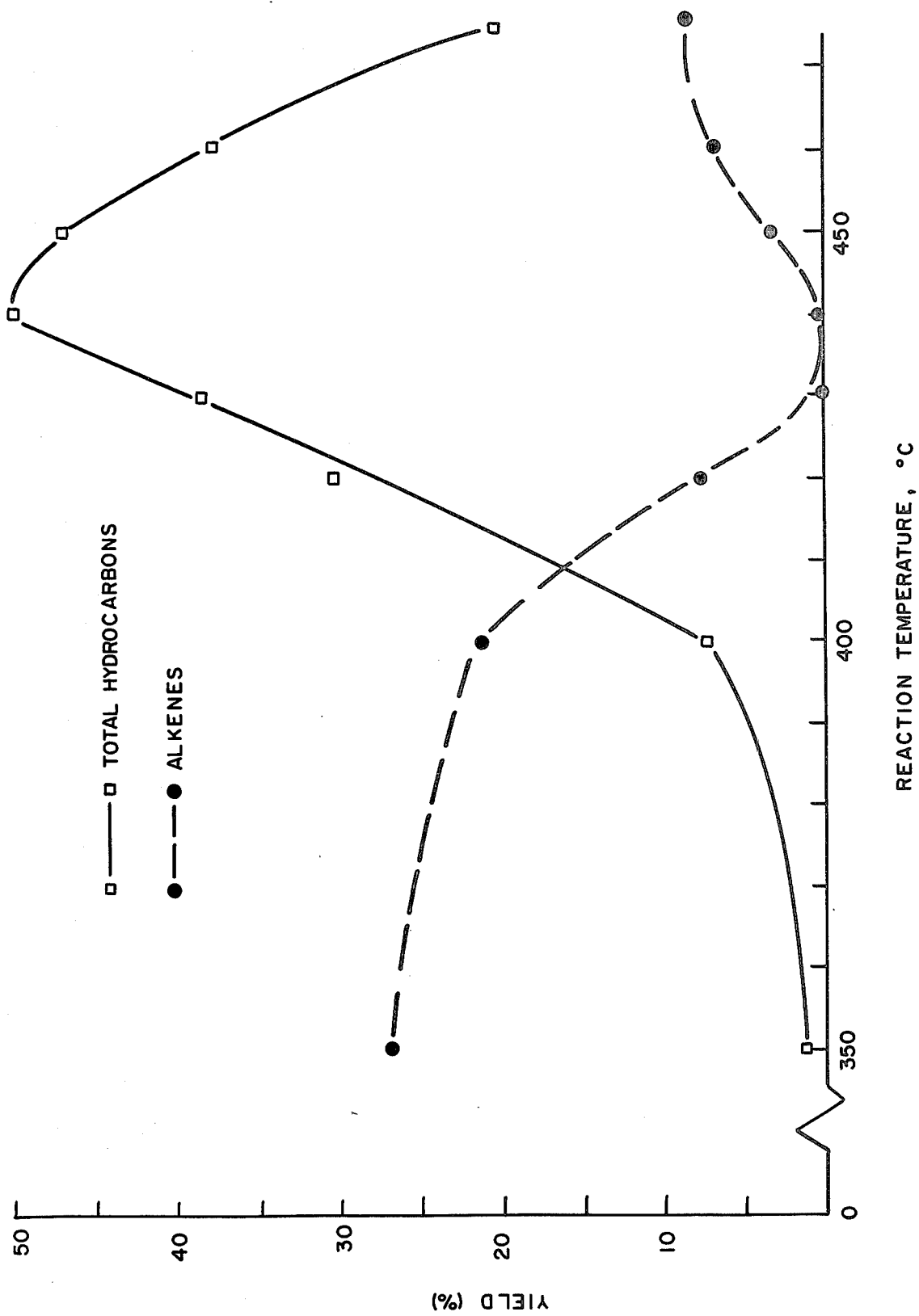

PROCESS FOR PRODUCING HYDROCARBON GAS FROM ORGANIC PLANT MATERIAL

BACKGROUND OF THE INVENTION

This invention relates to a process for converting plant derived organic materials to high BTU heating gas.

Presently, high BTU gas is obtained naturally or is produced from liquid or solid hydrocarbons such as coal, crude petroleum or refined hydrocarbons obtained from crude petroleum. While processes based upon these feed stocks presently are used commercially, their use is undersirable since the feed stocks are expensive. Presently, relatively large quantities of waste organic material are derived from commercial operations such as in the production of paper pulp or as waste plant material in the harvesting of wood products, fruits, vegetables or grains. It would be desirable to provide a process for forming high BTU gas which utilizes such organic materials since they are a relatively inexpensive source of organic material and their disposal is desirable. The advantages of such a process not only would be economic in that the feed materials would be relatively inexpensive, but also because plant-derived organic material such as wood or waste products such as bark or pulp mill spend liquors or the like are replenishable.

Accordingly, it is an object of this invention to provide a process for converting plant-derived organic material to high BTU gas. It is a further object of this invention to provide such a process wherein high yield of the high BTU gas is obtained. Further objects of this invention will become evident in view of the following disclosure.

SUMMARY OF THE INVENTION

This invention is based upon the discovery that plant-derived organic material can be converted to high BTU gas selectively when the organic material is reacted with ammonia in the presence of a hydrogenation catalyst and a vanadium catalyst. Under the reaction conditions employed, the vanadium catalyst appears to promote decomposition of ammonia to form hydrogen which then is reacted with the organic material to form the high BTU gas.

DETAILED DESCRIPTION OF THE INVENTION

In accordance with this invention, it has been found that significant conversion of plant derived organic materials to high BTU gas can be obtained when conducting the reaction in the presence of ammonia and in the presence of certain catalysts. The reaction is conducted in an atmosphere free of oxygen such as a nitrogen atmosphere or an inert gas atmosphere. The reaction is conducted at elevated temperatures and pressures for a suitable time to obtain significant conversion to the high BTU gas. The high BTU gas then is recovered from the reaction zone.

In accordance with this invention, it is necessary to utilize a catalyst composition comprising a vanadium composition wherein the vanadium is either in the +3 or +4 oxidation state or is converted to the +3 or +4 oxidation in situ. Representative suitable sources of +3 or +4 vanadium are vanadium pentoxide dissolved with reduction by heating in concentrated hydrochloric acid. One form of the catalyst comprises oxovanadium chloride which is precipitated by increasing the pH of the acid solution to above about 8 such as with aqueous concentrated ammonia solution. The +3 vanadium may be obtained by reducing the acid solution of the +4 vanadium by heating it with a slight excess of a soluble organic matter source, such as glucose or methanol. Surprisingly, it has been found that vanadium in the +5 state is not useful as a catalyst in the process of this invention. It is believed that the vanadium catalyst herein functions to decompose the ammonia thereby providing a source of hydrogen which is subsequently utilized by reaction with the organic material thereby to produce the high BTU gas.

Reaction of the hydrogen with the organic material is catalyzed by any one or a combination of known hydrogenation catalysts. Suitable hydrogenation catalysts are known in the art, for instance, these catalysts can include copper sulfide, oxides and sulfides of any metal of Group VI lefthand column of the Periodic system or mixture thereof, such as, chromium sulfide, molybdenum sulfide, tungsten sulfide and the like; oxides and sulfides of Group VIII of the Periodic Table or mixture thereof, such as, the sulfides of iron, cobalt, nickel, palladium, plaatinum, rhodium, osmium, iridium; mixtures of the above oxides and sulfides of the metals of Group VI lefthand column and Group VIII, such as, a mixture of nickel sulfide and tungsten sulfide, cobalt sulfide and molybdenum sulfide, nickel sulfide and molybdenum sulfide and the like. These metals can be unsupported or deposited on absorbent carriers such as alumina, silica-alumina, silica-zirconia, among others. Preferred catalysts include those comprising nickel sulfide, copper sulfide, or cobalt sulfide.

The ammonia can be present either as ammonia gas or can be added to the reaction zone in the form of an ammonia precursor which decomposes to form ammonia under the reaction conditions such as ammonium hydroxide or ammonium chloride. Generally, ammonia is present in amounts to form hydrogen gas greatly in excess of stoichiometric concentrations thereby to form $C_1$ to $C_5$ gaseous products. Reaction generally is carried out in the presence of water so that improved contact between ammonia and the organic material is obtained.

Any plant-derived organic material is useful in the process of this invention, such as paper, sawdust, garbage, sugar cellulose, carbohydrates, proteins, alcohols, lipids, lignin, carragheen, mixtures thereof and the like.

Reaction is effected at a temperature to obtain relatively high conversion to the high BTU gas while minimizing the production of undesirable char. The actual optimum temperature utilized will vary with the catalyst and generally will be between about 350° C. and about 700° C., usually between about 400° C. and 480° C. Reaction pressures are not critical and, in the process of this invention, can be maintained between about atmospheric and about 250 atmospheres or greater. It is believed that under the conditions utilized in the present invention, the vanadium catalyst promotes the conversion of the ammonia component to hydrogen gas which then is consumed in the reaction with organic radicals formed from the organic material to produce the high BTU gas comprising primarily $C_1$ to $C_5$ alkanes. The high BTU gas thus obtained then is recovered from the reaction zone.

The process can be carried out as either a batch process or as a continuous process. In the continuous process, the reactants are fed into the reactor under heat and pressure and the product gas is drawn out continuously therefrom.

The following examples illustrate the present invention and are not intended to limit the same.

EXAMPLE I

This example illustrates the conversion of a variety of plant organic materials to high BTU gas in moderately high yields (50% to 75% on a carbon-carbon basis) involving the presence of vanadium (IV) compounds, NiS, water, and ammonia heated together at about 440° C. for 15 hours in an $O_2$-free environment.

In a typical simulation reaction, 2.5 g $V_2O_5$ was dissolved by heating in 25 ml concentrated HCl to form the V (IV) compound, oxovanadium chloride. Five g $NiCl_2.6H_2O$ was dissolved in 25 ml $H_2O$ and added to the V(IV) solution. To this was added about 3 g of the organic substrate along with 20 ml concentrated aqueous $NH_3$, and a solution of 7.5 g $Na_2S$. $9H_2O$ in 25 ml $H_2O$. The total mixture was transfered to a 300 ml stainless steel (316 SS) reaction vessel (inside diameter 38 mm, inside depth 250 mm), the contents flushed twice with 50 atmospheres $N_2$ and then reduced to ambient pressure to form an oxygenfree atmosphere. The sealed vessel was heated to the desired temperature (from 350° C. to 475° C.) for 15 hours with continuous rocking action during the heating period.

After cooling to room temperature, the gas volume was measured and sampled. The gas, which was highly flammable, was analyzed on a Varian Model 1860-4 gas chromatograph (flame ionization detector, temperature programmed from 40° C. to 260° C. at 8°/min, $N_2$ carrier gas at 30 ml/min) using a 2 m × 1.5 mm ID stainless steel column packed with Porapak R (80–100 mesh, Waters Associates, Inc., Framingham, MA). Peaks were identified by comparing retention times with authentic samples of each of the hydrocarbons listed in Table 1, and the use of these samples as internal standards. In addition, confirmatory tests for identification and quantification were carried out using a 1.5 m × 3 mm ID stainless steel column packed with alumina (Woelm Grade I, same conditions as listed above for the Porapak column). Peak areas were determined with an electronic integrator (Hewlett Packard Model 3380A), and quantitative calculations were made by comparing peak areas of the unknowns with peak areas obtained from known quantities of authentic samples. Actual injections to the chromatograph were made using 1/100 dilutions in air in order to stay within the region of the linear response of the chromatograph system. The precision of the gas analyses as well as that of replicate experiments was estimated by calculating the average percent relative standard deviation for each set of data. These values are listed in Tables 1 and 2.

In those gas samples where alkenes were detected, it was not possible with this system to separate completely the butenes from the associated alkanes. In these cases the alkenes were removed by treating the gas samples with a slight excess of $Br_2$; the total alkene and alkane content were then determined by comparing peak areas before and after the $Br_2$ treatment.

A complete set of $C_1$ through $C_5$ alkanes, except for 2,2-dimethyl propane, and cyclopentane can be generated from a variety of biological precursors under the conditions described above (Table 1). For precursors such as proteins and carbohydrates that contain structural chains of lengths up to 6 C atoms, approximately 50% or more of the alkanes produced contain chains of 3 to 5 C atoms in length. For precursors containing one or two C atoms, 85 to 96% of the alkanes produced are equal to or shorter than the chain length of the precursor. However, approximately 15% of the C in glycine, 13% of the C in ethanol, and 4.5% of the C in methanol is converted to alkanes with chain lengths longer than that of the precursor. The probable explanation of these observations is that the organic precursor degrades into a variety of free radicals which then recombine with each other and with H released from $NH_3$ to form most of the possible alkane structures in the $C_1$ to $C_5$ range.

To determine the effect of temperature on the reaction with cellulose, a series was run at temperatures ranging from 350° C. to 475° C. The total yield of hydrocarbons produced as percentages of the original cellulose on a carbon-carbon basis and the percent of the hydrocarbons occurring as alkenes are presented in FIG. 1. The optimum temperature for the reaction both in terms of total hydrocarbons produced as well as a minimum yield of alkenes is approximately 440° C.

In order to determine the effects of each of the reaction components individually as well as possible catalytic effects of the reactor walls, a series of control experiments was run (Table 2). About 6.4% of carbon in dry cellulose is thermally degraded into $C_1$ to $C_5$ alkanes and alkenes. The addition of $H_2O$ raises the yield to about 9%, and the substitution of concentrated aqueous $NH_3$ does not change the overall yield or distribution of hydrocarbons appreciably. These data suggest that there are relatively small but detectable effects of the reactor walls along with thermal effects in the production of hydrocarbons.

The addition of either $NiCl_2$ or NiS to the $NH_3$-cellulose mixture approximately doubles the overall yield of hydrocarbons, with the greatest increase occurring in the $C_1$ to $C_3$ hydrocarbons (Reactions 4 and 5, Table 2). Therefore, the Ni salts have a definite catalytic activity on the decomposition of cellulose but the continued presence of alkenes suggested that if hydrogenation reactions are taking place, they are incomplete.

Vanadium in oxidation states III, IV and V were added to the reaction along with NiS. V(V) added as $V_2O_5$ appears to have no catalytic activity (Reaction 10) as the yields were not significantly different from the same reaction without the $V_2O_5$ (Reaction 5). V(III) (formed by reducing the oxovanadium chloride solution with a slight excess of a soluble organic substance, such as glucose or methanol), plus NiS (Reaction 11), however, produced approximately a 50% increase in yield over Reaction 10 and the complete absence of alkenes, indicating that the V(III) released adequate H from the $NH_3$ to cause saturation of any alkenes that may have occurred in the absence of V(III) (Reaction 5). The addition of V(IV), (added as oxovanadium chloride), (Reaction 9) produced a total hydrocarbon yield from cellulose of nearly 50% along with the complete absence of alkenes. This combination of $NH_3$, V and NiS is the most effective determined to date for the generation of alkanes from cellulose. The essentiality of $NH_3$ in this reaction is shown by Reaction 12 where NaOH is substituted for the $NH_3$, with a subsequent reduction in hydrocarbon yields to nearly zero. Likewise, the addition of $NiCl_2$ or $Na_2S$ (Reactions 7 and 8) has little effect over that obtained by the use of V(IV) alone (Reaction 6).

The effect of clay and $CaCO_3$ on the generation of gaseous hydrocarbons was investigated. No significant effect of expanded western bentonite on either the total yield or distribution of individual hydrocarbons was observed. However, the presence of 5 g CaCO$_3$ in the reaction mix (Reaction 13) with cellulose as the organic substrate reduced the overall yield of hydrocarbons to less than one-half that obtained without CaCO$_3$, with the largest percentage reduction occurring in the C$_2$ to C$_5$ alkanes.

Table I shows the generation of gaseous hydrocarbons from various organic precursors when heated at 440° C. for 15 hours in the presence of V(IV) compounds, NiS, NH$_3$, NaCl, H$_2$O and excess sulfide in an alkaline, O$_2$-free environment. All yield data expressed in percent on a carbon-carbon basis. Average percent relative standard deviation of total hydrocarbon data=5.94%; for replicate analyses of individual gases within a given experiment=9.46%.

Table II shows the effect of various combinations of components on thermocatalytic generation of gaseous C$_1$ through C$_5$ hydrocarbons from 3 g cellulose at 440° C. (all data in percent of original carbon content of cellulose). Average relative percent standard deviation between replicate experiments=6.21%; among gas analyses within a single reaction=2.21% for C$_1$ through C$_3$ hydrocarbons, 11.35% for C$_4$ and C$_5$ hydrocarbons. The following symbols are used in the component column: H$_2$O=20 ml H$_2$O; NH$_3$=20 ml concentrated aqueous NH$_3$; NiCl$_2$=5.0 g NiCl$_2$.6H$_2$O dissolved in 25 ml H$_2$O; Na$_2$S=7.5 g Na$_2$S.9H$_2$0 dissolved in 25 ml H$_2$O; NiS= the two previous solutions added to the suspension; V5=2.5 g V$_2$O$_5$; V4=2.5 g V$_2$O$_5$ dissolved by heating in 25 ml concentrated HCl; V3=2.5 g V$_2$O$_5$ dissolved by heating in 25 ml concentrated HCl containing 0.3 glucose; NaOH=sufficient 4 N NaOH solution added to bring the pH of the suspension to a pH of 8 to 9; CaCO$_3$=5.0 g CaCO$_3$ added to the suspension.

TABLE II

| Reaction Number | Components | Total Hydrocarbons | CH$_4$ | C$_2$H$_4$ | C$_2$H$_6$ | C$_3$H$_6$ | C$_3$H$_8$ | iso-C$_4$H$_{10}$ | n-C$_4$H$_{10}$ | Butenes | iso-C$_5$H$_{12}$ | n-C$_5$H$_{12}$ | cyclo-C$_5$H$_{10}$ |
|---|---|---|---|---|---|---|---|---|---|---|---|---|---|
| 1. | dry cellulose | 6.40 | 1.50 | 0.01 | 2.47 | | 1.99 | 0.26 | 0.17 | | | | |
| 2. | H$_2$O | 9.48 | 3.36 | 0.07 | 2.21 | 0.21 | 1.38 | 0.15 | 1.03 | 0.19 | 0.24 | 0.60 | 0.04 |
| 3. | NH$_3$ | 9.17 | 3.47 | 0.17 | 2.93 | 0.35 | 1.28 | 0.05 | 0.53 | 0.14 | | 0.25 | |
| 4. | NH$_3$ + NiCl$_2$ | 18.03 | 7.86 | 0.05 | 3.95 | 0.42 | 3.29 | 0.53 | 1.08 | 0.16 | 0.25 | 0.27 | 0.17 |
| 5. | NH$_3$ + NiS | 22.42 | 11.41 | 0.20 | 3.55 | 1.32 | 2.53 | 0.24 | 1.41 | 0.50 | 0.30 | 0.86 | 0.10 |
| 6. | NH$_3$ + V4 | 34.71 | 10.80 | | 7.64 | | 9.62 | 1.87 | 2.64 | | 1.33 | 0.60 | 0.21 |
| 7. | NH$_3$ + V4 + NiCl$_2$ | 30.83 | 8.98 | | 7.22 | | 8.28 | 2.40 | 2.32 | 0.17 | 0.90 | 1.33 | 0.23 |
| 8. | NH$_3$ + V4 + Na$_2$S | 32.26 | 10.93 | | 6.28 | 1.05 | 7.22 | 1.52 | 2.81 | 0.52 | 1.73 | 0.06 | 0.14 |
| 9. | NH$_3$ + V4 + NiS | 49.77 | 13.44 | | 11.30 | | 15.04 | 2.66 | 4.47 | | 1.41 | 0.89 | 0.56 |
| 10. | NH$_3$ + V5 + NiS | 18.17 | 11.04 | 0.16 | 2.25 | 1.33 | 1.75 | | 0.52 | 0.43 | 0.44 | 0.25 | |
| 11. | NH$_3$ + V3 + NiS | 34.05 | 6.99 | | 7.55 | | 10.82 | 2.55 | 3.62 | | 1.62 | 0.49 | 0.41 |
| 12. | NaOH + V4 + NiS | 2.66 | 1.09 | 0.03 | 0.23 | 0.52 | 0.25 | 0.09 | 0.19 | | | 0.26 | |
| 13. | NH$_3$ + V4 + NiS + CaCO$_3$ | 19.54 | 9.36 | 0.04 | 3.56 | 0.84 | 2.46 | 0.68 | 1.18 | 0.63 | 0.27 | 0.48 | 0.04 |

TABLE I

| Component | Hydrocarbons | CH$_4$ | C$_2$H$_4$ | C$_2$H$_6$ | C$_3$H$_6$ | C$_3$H$_8$ | iso-C$_4$H$_{10}$ | n-C$_4$H$_{10}$ | Butenes | iso-C$_5$H$_{12}$ | n-C$_5$H$_{12}$ | cyclo-C$_5$H$_{10}$ |
|---|---|---|---|---|---|---|---|---|---|---|---|---|
| Carbohydrates | | | | | | | | | | | | |
| Cellulose | 49.77 | 13.44 | | 11.30 | | 15.04 | 2.66 | 4.47 | | 1.41 | 0.89 | 0.56 |
| Carragheen | 32.92 | 10.04 | | 5.23 | | 8.71 | 3.13 | | | 2.91 | 0.94 | |
| Alginic acid | 32.14 | 8.26 | | 6.32 | | 9.69 | 2.16 | 3.74 | | 0.99 | 0.40 | 0.58 |
| Glucose | 29.55 | 10.32 | | 5.39 | | 10.40 | 1.16 | 1.76 | | | 0.52 | |
| Methanol | 75.28 | 71.86 | | 1.74 | | 0.97 | 0.26 | 0.30 | | 0.06 | 0.09 | |
| Ethanol | 69.19 | 16.18 | | 44.04 | | 4.11 | 1.06 | 2.72 | | | 0.84 | 0.24 |
| Proteins | | | | | | | | | | | | |
| Zein | 43.47 | 6.84 | | 6.65 | | 12.19 | 7.28 | 3.87 | | 5.27 | 0.97 | 0.40 |
| Soy protein | 36.97 | 9.64 | 0.02 | 6.22 | 0.22 | 9.00 | 4.65 | 3.50 | | 2.80 | 0.80 | 0.12 |
| Alfalfa leaf prot. | 48.04 | 8.34 | | 6.61 | | 10.99 | 7.13 | 6.09 | | 8.19 | 0.28 | 0.41 |
| Glycine | 30.19 | 22.94 | | 2.70 | | 2.44 | 0.60 | 1.00 | | 0.19 | | 0.32 |
| Lipids | | | | | | | | | | | | |
| Corn oil | 30.82 | 4.22 | 0.02 | 4.72 | 0.34 | 8.07 | 1.80 | 5.38 | 0.21 | 3.22 | 2.64 | 0.20 |
| Soy bean oil | 27.38 | 4.40 | 0.03 | 4.90 | 0.20 | 7.15 | 1.73 | 4.33 | 0.27 | 1.79 | 2.61 | 0.42 |
| Kraft lignin | 18.22 | 9.93 | | 3.26 | | 3.28 | 0.28 | 0.71 | | 0.22 | 0.49 | 0.05 |

I claim:

1. The process for converting an organic material selected from the group consisting of a plant-derived organic material, an alcohol, a sugar, and mixtures thereof to a high BTU gas which comprises heating said organic material with ammonia, in the presence of a vanadium catalyst wherein the vanadium is in the +3 or +4 state and a hydrogenation catalyst in an atmosphere substantially free of oxygen and recovering a gaseous product.

2. The process of claim 1 wherein the organic material is cellulose.

3. The process of claim 1 wherein the organic material is wood.

4. The process of claim 1 wherein the vanadium catalyst is oxovanadium chloride.

5. The process of claim 1 wherein the hydrogenation catalyst is nickel sulfide.

6. The process of claim 1 wherein the hydrogenation catalyst is nickel chloride.

7. The process of claim 1 wherein the organic material is heated to a temperature between about 350° C. and 450° C.

* * * * *